US012711022B2

(12) United States Patent
Jain et al.

(10) Patent No.: US 12,711,022 B2
(45) Date of Patent: Aug. 18, 2026

(54) BULK RECOVERY FRAMEWORK FOR COMPUTING OBJECTS

(71) Applicant: Rubrik, Inc., Palo Alto, CA (US)

(72) Inventors: Gaurav Jain, Cork (IE); Rishabh Singhal, Bangalore (IN); Eran Carmel, Campbell, CA (US); Prateek Pandey, Bangalore (IN); Shaomin Chen, San Jose, CA (US)

(73) Assignee: Rubrik, Inc., Palo Alto, CA (US)

( * ) Notice: Subject to any disclaimer, the term of this patent is extended or adjusted under 35 U.S.C. 154(b) by 6 days.

(21) Appl. No.: 18/446,780

(22) Filed: Aug. 9, 2023

(65) Prior Publication Data

US 2025/0053483 A1 Feb. 13, 2025

(51) Int. Cl.
*G06F 11/00* (2006.01)
*G06F 11/1446* (2026.01)
*G06F 11/32* (2006.01)

(52) U.S. Cl.
CPC ...... *G06F 11/1469* (2013.01); *G06F 11/1464* (2013.01); *G06F 11/328* (2013.01); *G06F 2201/84* (2013.01)

(58) Field of Classification Search
CPC ............. G06F 11/1469; G06F 11/1464; G06F 11/328; G06F 2201/84
See application file for complete search history.

(56) References Cited

U.S. PATENT DOCUMENTS 8,099,572 B1 1/2012 Arora et al.
11,797,478 B1 * 10/2023 Shatsky ................ G06F 3/0673
2017/0212811 A1 * 7/2017 Kashnikov .......... G06F 11/1451
2020/0319979 A1 * 10/2020 Kulaga ............... G06F 11/3006
2020/0327097 A1 * 10/2020 Birka .................. G06F 16/1734
2021/0209068 A1 * 7/2021 Appireddygari Venkataramana .. G06F 11/1466
2022/0100378 A1 * 3/2022 Borate .................. G06F 21/568
2023/0147026 A1 5/2023 Munshani et al.
2023/0177158 A1 * 6/2023 Gee ....................... G06F 21/568 726/22
2023/0334011 A1 * 10/2023 Shatsky .................. G06F 3/067
2023/0385153 A1 * 11/2023 George ............... G06F 11/1435
2024/0143454 A1 * 5/2024 Katuri ................. G06F 11/1469

OTHER PUBLICATIONS

"International Search Report and Written Opinion of the International Searching Authority," issued in connection with Int'l Appl. No. PCT/US2024/038875, dated Oct. 14, 2024 (12 pages).

* cited by examiner

*Primary Examiner* — Elmira Mehrmanesh
(74) *Attorney, Agent, or Firm* — Holland & Hart LLP

(57) ABSTRACT

Methods, systems, and devices for data management are described. A data management system may support techniques for bulk object selection and recovery for a set of computing objects. The data management system may receive an indication of a backup snapshot group identifier which defines a selection of a group of backup snapshots for performing a bulk recovery. The backup snapshot group identifier is then translated into a materialized list of object identifiers corresponding to the set of backup snapshots for storage in a binary large object (BLOB) data store. The data management system may then perform the bulk recovery on a subset of the set of backup snapshots contained within a sliding window that is iterated through the list of object identifiers within the BLOB data store.

18 Claims, 12 Drawing Sheets

Figure 4:
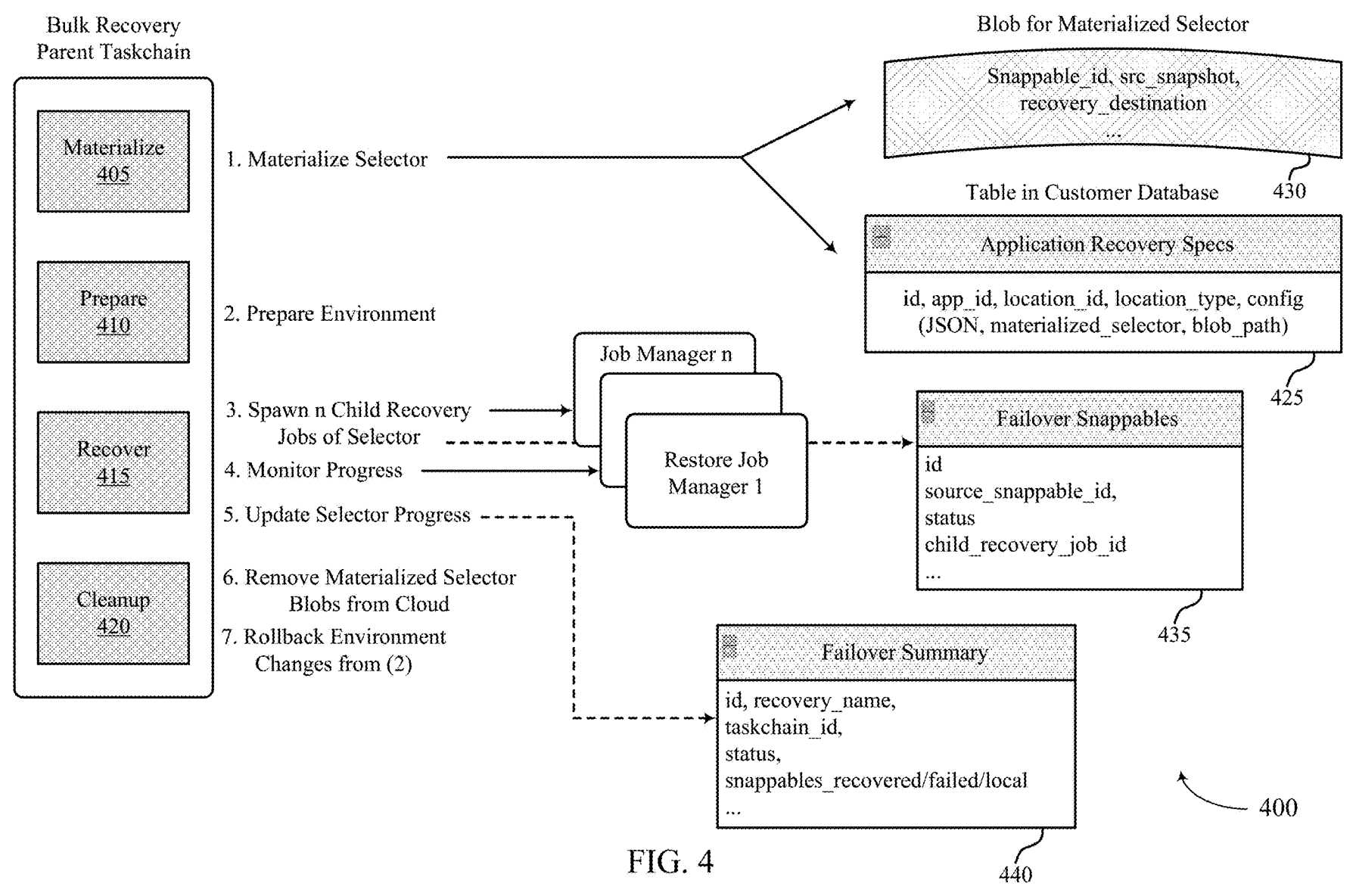

Bulk Recovery Parent Taskchain

Materialize 405

Prepare 410

Recover 415

Cleanup 420

1. Materialize Selector

2. Prepare Environment

3. Spawn n Child Recovery Jobs of Selector

4. Monitor Progress

5. Update Selector Progress

6. Remove Materialized Selector Blobs from Cloud

7. Rollback Environment Changes from (2)

Blob for Materialized Selector

Snappable_id, src_snapshot, recovery_destination ...

430

Table in Customer Database

Application Recovery Specs id, app_id, location_id, location_type, config (JSON, materialized_selector, blob_path)

425

Job Manager n

Restore Job Manager 1

Failover Snappables id source_snappable_id, status child_recovery_job_id ...

435

Failover Summary id, recovery_name, taskchain_id, status, snappables_recovered/failed/local ...

BULK RECOVERY FRAMEWORK FOR COMPUTING OBJECTS

FIELD OF TECHNOLOGY

The present disclosure relates generally to data management, including techniques for bulk recovery framework for computing objects.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

BRIEF DESCRIPTION OF THE DRAWINGS

FIG. 4 shows an example of a bulk selection and recovery process that supports bulk recovery framework for computing objects in accordance with aspects of the present disclosure.

DETAILED DESCRIPTION

Software-as-a-service (SaaS) platforms may organize information hosted in a distributed environment across business applications and data, while supporting user visibility and control over applications located in a datacenter or in a cloud environment. Such SaaS platforms may display a relatively large quantity of SaaS objects that a user can monitor and visualize. Such SaaS platforms may also provide an interface that allows a user to individually select one or more SaaS objects (e.g., data snapshots) to back up or recover (e.g., using cloud-native protection or ransomware recovery). In some cases, however, the individual selection of SaaS objects (and the individual triggering or recovery or backup) may be relatively inefficient, especially when selecting and recovering a large number of objects after a ransomware attack, or when updating SaaS objects to a new subscription. In addition, the individual selection of SaaS objects may provide an event stream of individual recovery jobs, but may not provide a unified mechanism for tracking the progress of multiple object recoveries concurrently. Further, the individual selection of SaaS objects may pose challenges for implementing updates to the recovery jobs being performed, for example, for canceling or updating an ongoing recovery for a bulk set of SaaS objects.

To support efficient selection and maintenance of a set of SaaS objects and to mitigate the inefficiencies of individual SaaS object selection, a data management system may support bulk (e.g., mass) selection and recovery of the SaaS objects within the SaaS platform. This bulk selection may allow a user to recover multiple SaaS objects relatively quickly using the bulk selection, while tracking the recovery progress of the multiple SaaS objects at once and if needed, cancel or otherwise modify the recovery of the selected SaaS objects.

The bulk selection and recovery execution begins by obtaining a bulk recovery plan, where a selector defines a collection of SaaS objects. The process then includes a materialization step which takes the definitions identified by the selector and materializes the objects into an actual list of objects or snapshots to be selected and included in the bulk recovery. The system then prepares a recovery environment for bulk recovery (e.g., based on the type of objects included in the selected group), and performs the bulk recovery. During the bulk recovery, a recovery task parses through the list of objects corresponding to the selector definition and begins an iterative recovery via a sliding window for each object in the selected bulk recovery. During the bulk recovery, the recovery task parses through the list of objects corresponding to the selector definition and the corresponding snapshots that are each associated with a recovery point. After the bulk recovery has finished, a cleanup task is initiated to remove any remaining persisted states left from the bulk or mass recovery.

Figure 1:
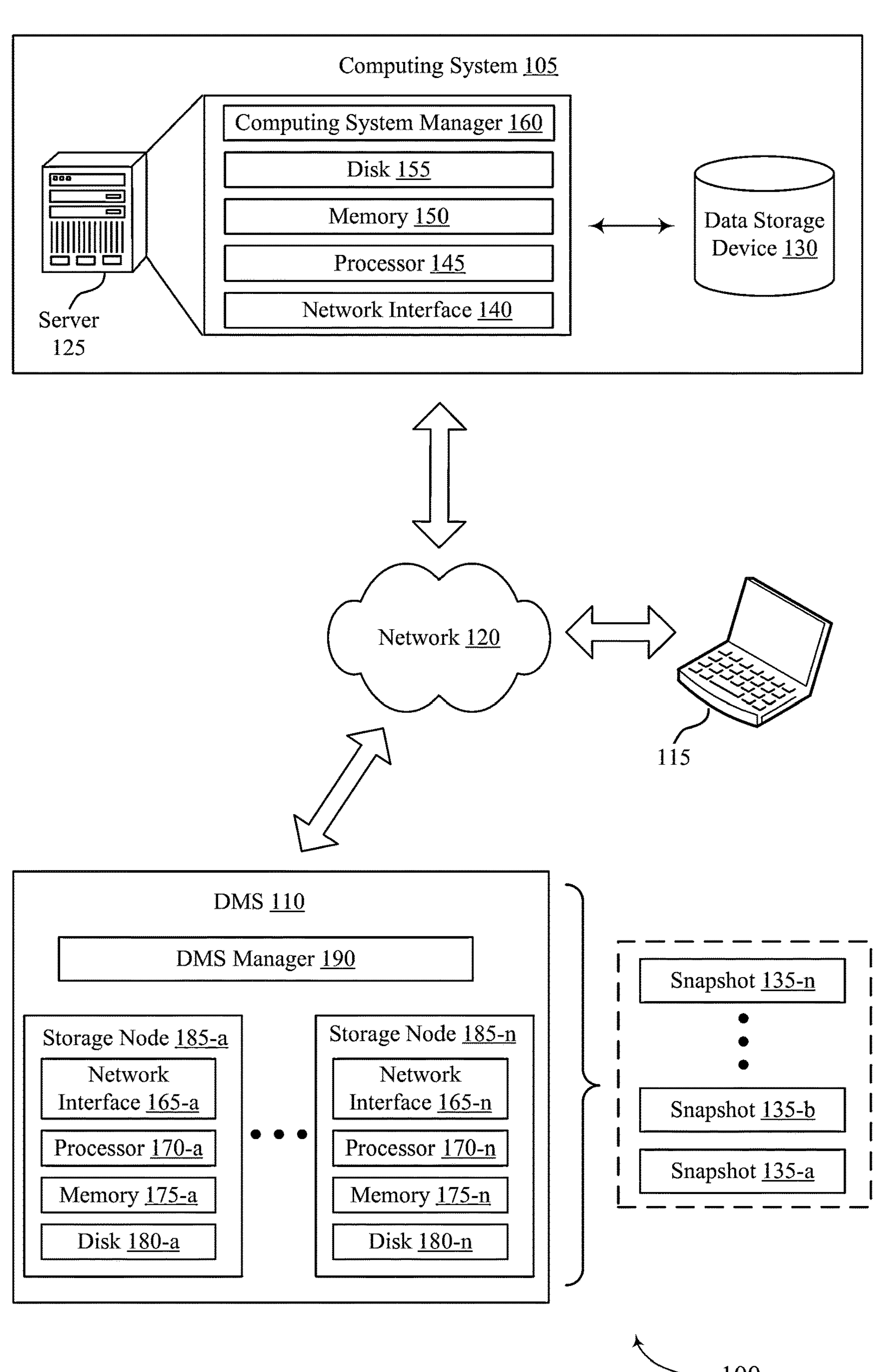
FIG. 1 illustrates an example of a computing environment that supports bulk recovery framework for computing objects in accordance with aspects of the present disclosure.

FIG. 1 illustrates an example of a computing environment 100 that supports bulk recovery framework for computing objects in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g. a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

Some computing systems 105 may host a relatively large quantity of SaaS objects that a user may monitor and individually select to back up or recover (e.g., using cloud-native protection or ransomware recovery). In some cases, however, the individual selection of SaaS objects (and the individual triggering or recovery or backup) may be inefficient, especially when selecting and recovering a large number of objects after a ransomware attack.

To support efficient selection and maintenance of a set of SaaS objects and to mitigate the inefficiencies of individual SaaS object selection, the DMS 110 may support bulk selection and recovery of the SaaS objects within a recovery platform. This bulk selection may allow a user to recover multiple SaaS objects relatively quickly using the bulk selection, while tracking the recovery progress of the multiple SaaS objects at once and if needed, cancel or otherwise modify the recovery of the selected SaaS objects.

The bulk selection and recovery execution begins by obtaining a bulk recovery plan, where a selector defines a collection of SaaS objects or data snapshots. The process then includes a materialization step which takes the definitions identified by the selector and materializes them into an actual list of objects or snapshots to be selected and included in the bulk recovery. The system then prepares a recovery environment for bulk recovery, and performs the bulk recovery. After the bulk recovery has finished, a cleanup task is initiated to remove any remaining persisted states left from the bulk recovery.

Figure 2:
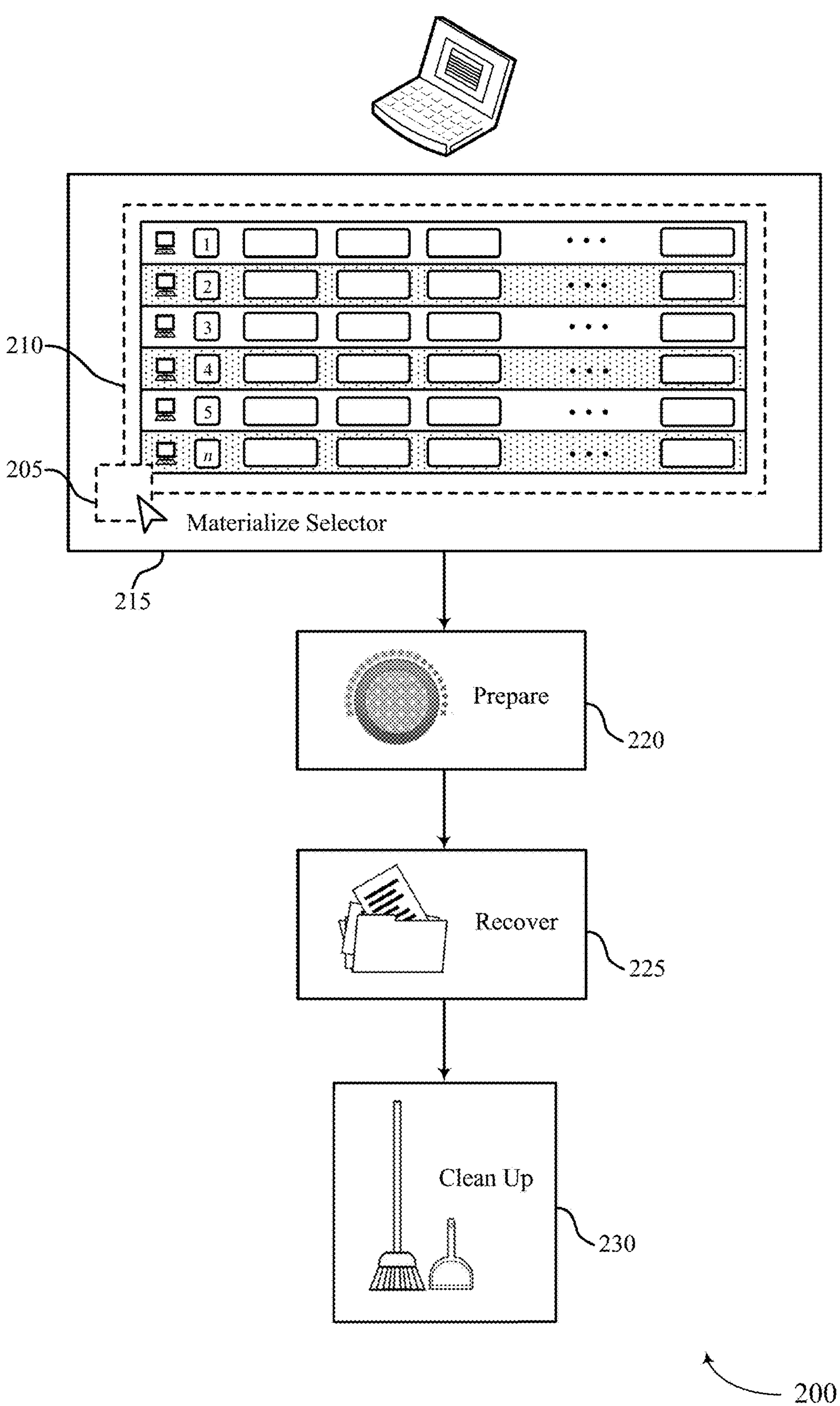
FIG. 2 shows an example of a bulk selection and recovery process that supports bulk recovery framework for computing objects in accordance with aspects of the present disclosure.

FIG. 2 shows an example of a bulk selection and recovery process 200 that supports bulk recovery framework for computing objects in accordance with aspects of the present disclosure. For example, the bulk selection and recovery process 200 may illustrate a process for materializing a selector for a bulk group of data snapshots, preparing a recovery environment, performing a group recovery, and cleaning up the recovery environment.

Some SaaS platforms may effectively organize information hosted in a distributed environment into a unified system across business applications and data, while supporting user visibility and control over all applications located in a datacenter or in a cloud environment. Such SaaS platforms may display a relatively large quantity of SaaS objects (e.g., Microsoft 365 (M365) OneDrives, M365 exchange mailboxes, M365 teams, Google Suite objects, Atlassian) that a user can monitor and visualize. In addition, SaaS platforms provide an interface that allows a user to individually select one or more SaaS objects to back up or recover (e.g., using cloud-native protection or ransomware recovery). In some cases, however, the individual selection of SaaS objects (and the individual triggering or recovery or backup) may be relatively inefficient, especially when recovering a large number of objects after a ransomware attack or when updating SaaS objects to a new subscription. In addition, the individual selection of SaaS objects may provide an event stream of individual recovery jobs, but may not provide a mechanism for tracking the progress of multiple object recoveries concurrently. Further, the individual selection of SaaS objects may pose challenges for implementing updates to the recovery jobs being performed, for example, for canceling or updating an ongoing recovery for a bulk set of SaaS objects.

To support more efficient selection and maintenance of a set of SaaS objects, a system may support bulk-selection of the SaaS objects within the SaaS platform or other recovery environment to reduce the inefficiencies of individual SaaS object selection. This bulk selection may allow a user to recover multiple SaaS objects quickly, while tracking the recovery progress of the multiple SaaS objects at once, and if needed, cancel or otherwise modify the recovery of the selected SaaS objects (or a subset of the SaaS objects). The bulk selection and recovery execution begins by obtaining a bulk recovery plan, where a selector 205 defines (or provides a rule that defines) a collection of SaaS objects 210. The process then includes a materialization step 215 which takes the definitions identified by the selector and materializes them into an actual list of objects to be recovered. The system then prepares the environment at prepare step 220 for bulk recovery (e.g., based on the type of objects or snapshots included in the selected group), and performs the bulk recovery at recovery step 225. During the recovery step 225, a "recover" task parses through the list of objects and snapshots corresponding to the selector definition and begins an iterative recovery for each object in the selected bulk recovery. After the recovery step 225 has finished, a cleanup task is initiated at cleanup step 230 to remove any remaining persisted states left from the bulk recovery.

In some examples, a selector may support groups of data snapshots that may be selected and recovered, rather than selection and recovery of singular data snapshots. For example, in some SaaS domains, an active directory group ID can represent a "selector" since an active directory group maps to a group of data objects within the domain, where each data object may include multiple snapshots (one of which is selected based on the recovery point), and the "selector" can be used to represent a collection of data snapshots for mass recovery. In addition, a selector definition may vary in context and structure. For example, a selector may include a comma-separated values (CSV) file based selector that lists selected data object IDs to be recovered, a set of data snapshots corresponding to a certain qualifier (e.g., "infected" snapshots, or any other selector format. In some examples, selector definitions may vary widely, and these variations may be captured as a Javascript object notation (JSON) BLOB (or any other kind of data blob) framework. Additionally or alternatively, supporting new selectors may include implementing a materializer interface that provides a method to translate the selector definition (as captured in JSON format) to the corresponding list of data objects.

The selector-based bulk recovery may be scaled to handle increasingly large quantities of data snapshots for recovery. This scalability may be supported by persisting materialized selectors in blob storage instead of a relational database, and by defining a generic selector that can translate a relatively large quantity (e.g., up to 100 thousand data snapshots or more during bulk selection and recovery). By storing the materialized list of data snapshots in cloud blob storage, a relatively large list of data snapshots may be stored in a file object that takes up a relatively small amount of cloud storage space, and allows for scaling up to even larger numbers of data snapshots (e.g., up to a million data snapshots or more) in a single selector without significantly impacting storage costs. Similarly, the cleanup of the materialized list of data snapshots once mass recovery may be performed as a one-shot operation by deleting the file object from blob storage.

In some examples, the bulk recovery framework recovers the data snapshots by maintaining a sliding window of recovery jobs that iterates through the complete list of materialized data snapshots belonging to the selector. In some cases, the size of the sliding window can be configured according to the data snapshot type. For example, a sliding window size may be increased or decreased based on the type of snapshot selected for bulk recovery.

In some examples, the bulk recovery framework may be extended across multiple different types of data snapshots within an SaaS recovery domain. For example, different interfaces for the materialization, prepare, recover, and cleanup steps may support different snapshot-specific logic. The materialization step 215 may include a materializer interface for data snapshot type or selector-specific logic to translate a given selector or group definition to a corresponding list of materialized data snapshots. The prepare step 220 may provide an interface (e.g., EnvPreparer) which may be implemented to prepare or set up any specific aspect of the recovery environment for the bulk recovery, such as tuning application service providers (ASPs) and exocluster team node counts. The recover step 225 may support a recovery interface (e.g., SnappableRecoverer) which may be used to configure the data snapshot type specific child recovery jobs. The recovery interface may also include logic to maintain the sliding window, and logic to maintain a state machine implementation to recover from task crashes. In such cases, the logic may be common across all snapshot types and recovery domains. The cleanup step 230 may support a cleanup method for the materialization step 215, the prepare step 220, and the recover step 225, which cleans up any persisted states and reverts any configuration changes left by completion of the steps. In some examples, the cleanup step 230 may be common across multiple different snapshot types and recovery domains.

The bulk selection and recovery process 200 may also support different mechanisms for unified progress tracking during and after selection and recovery. The progress tracking framework may track overall metrics of mass recovery such as the quantity of data snapshots recovered, the quantity of failed recoveries, the quantity of pending recoveries, the quantity of canceled recoveries, among other metrics, by updating the status of each child recovery job in a relational database. While the recovery is executing, the overall metrics may be retrieved by grouping child recovery job rows by their corresponding status. In such cases, the latest aggregate metrics of a mass recovery are periodically published according to a time interval (e.g., every few minutes) on a user interface displayed as a "running event."

Once the bulk recovery completes, the overall aggregate metrics may be saved as a separate JSON blob in the database for fast queries. The rows corresponding to each child recovery job may be deleted from the database once the JSON progress metrics include the summary information. A final terminal event may then be published with the aggregate metrics once the mass recovery completes, and an event displaying data snapshots whose recovery failed may also be published on the user interface along with the failure reason for each data snapshot.

Figure 3:
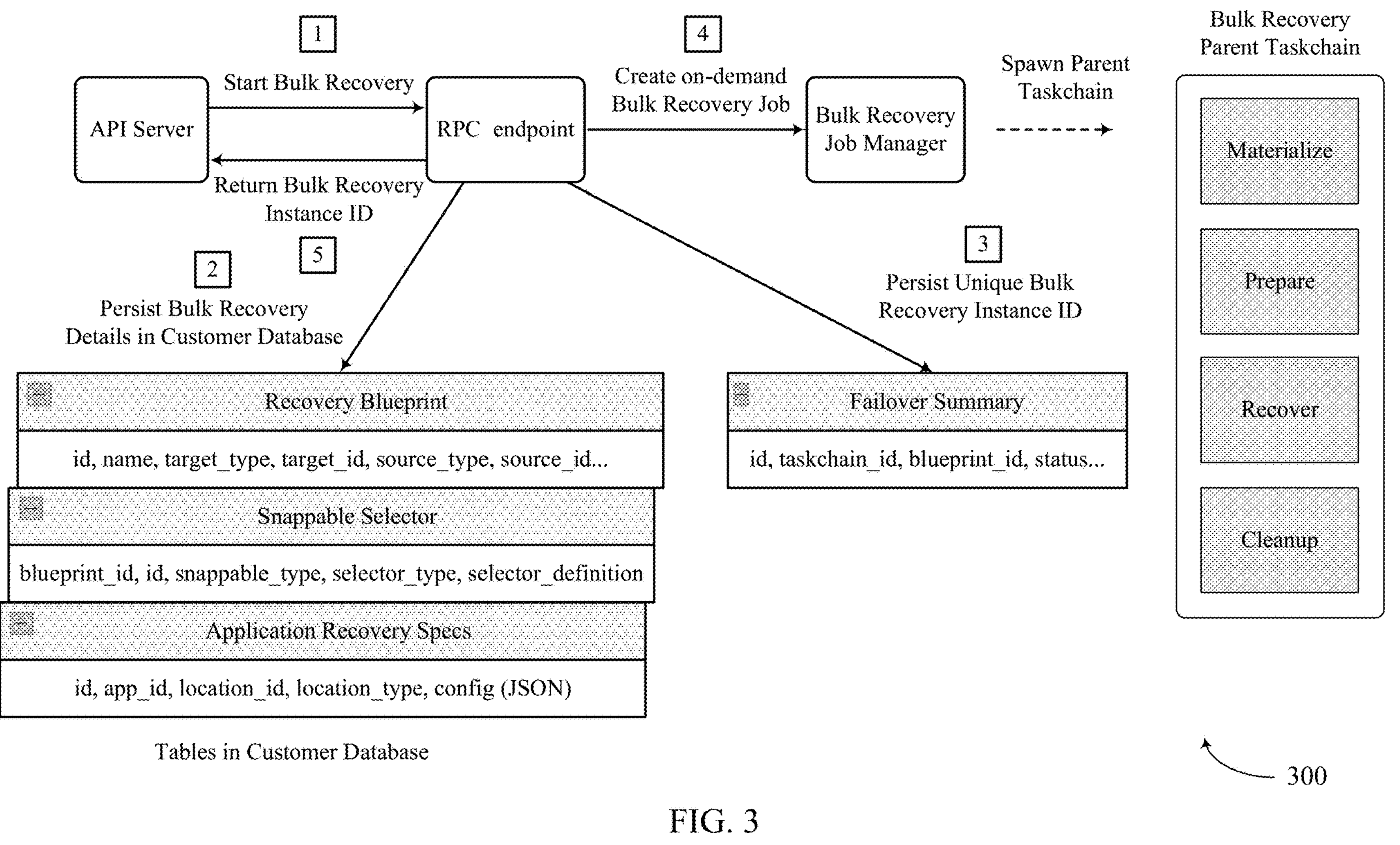
FIG. 3 shows an example of a bulk recovery flow that supports bulk recovery framework for computing objects in accordance with aspects of the present disclosure.

FIG. 3 shows an example of a bulk recovery flow 300 that supports bulk recovery framework for computing objects in accordance with aspects of the present disclosure. For example, the bulk recovery flow 300 may illustrate a process for executing a bulk recovery plan with a single selector. The bulk recovery flow may support the bulk recovery of data snapshots as described with reference to FIG. 2.

At a first step (1) the application programming interface (API) server may initiate the start of a bulk recovery. The remote procedure call (RPC) service may house endpoints for create, receive, update, delete (CRUD) operations associated with one or more bulk recovery plans. Additionally or alternatively, the RPC service may have endpoints for triggering the bulk recovery or for triggering bulk recovery from a saved bulk recovery plan.

For any bulk recovery (whether ad-hoc or triggered from a previously saved recovery plan), and as a second step (2), the bulk recovery details will be persisted in one or more tables. The RPC service may generate a unique bulk recovery instance ID, which is persisted in the failover summary table in a customer database. In addition, a parent bulk recovery task chain ID may be persisted in the failover summary table so that a job manager may map a bulk recovery instance ID to a corresponding parent bulk recovery task chain. Additional tables that store the bulk recovery details may be persisted and may include additional IDs, source information, target information, snapshot type, selector definitions, selector types, application IDs, JSON configuration, recovery location, SaaS application identifiers, and so on.

In a third step (3), a unique bulk recovery instance ID is persisted in the failover summary table, which may create an on-demand parent bulk recovery job to oversee the recovery of individual data snapshots of the bulk set of snapshots. Once the on-demand parent bulk recovery job has been successfully created during a fourth step (4), a bulk recovery instance ID may be returned to the API server, and a parent bulk recovery task chain is spawned, including materialization, preparation, recovery, and cleanup steps described with reference to FIG. 2 and further with reference to FIG. 3.

FIG. 4 shows an example of a bulk selection and recovery process 400 that supports bulk recovery framework for computing objects in accordance with aspects of the present disclosure. For example, the bulk selection and recovery process 400 may implement a quantity of specific tasks, including a materialize step 405, a prepare step 410, a recover step 415, and a cleanup step 420. The bulk selection and recovery process 400 may illustrate a mass recovery parent task chain for selecting and recovering a bulk set of data snapshots as described with reference to FIGS. 2-3.

During the materialize step 405, the system may materialize a selector definition by converting the selector definition to a materialized list of data snapshots (e.g., SaaS objects) to be recovered. In some examples, multiple selector definition may be used, and each selector definition may be materialized proactively in the beginning of bulk recovery plan execution. This allows for efficient tracking of the overall bulk recovery progress since the total number of data snapshots is known upfront and will remain constant during the execution of bulk recovery.

The materialized selector will be saved in a cloud storage environment, and the path to the cloud storage environment may be correspondingly stored in a JSON configuration column of the application recovery specs table 425 in a customer database. The materialized selector blob 430 in the cloud environment then includes the list of data snapshot IDs to be recovered (e.g., snappable id), a group selector that maps to a list of data snapshot IDs, a source snapshot ID to use for recovery of each data snapshot, a destination for each recovery that encodes the destination object ID in which the source snapshot is to be recovered. The application recovery specs table 425 may include a snapshot location type, a location ID, a failover ID (e.g., a reference for the failover ID in the failover summary table 440), and a SaaS application ID (e.g., a reference to the ID column in the recovery blueprint table).

During the prepare step 410, the system may prepare the recovery environment for bulk recovery based on the type of data object being recovered. For example, the prepare step 410 may include validating the environment configuration and tuning some knobs. A validation may in some examples include a hard validation or a soft validation. For example, a hard validation may indicate that the bulk recovery will fail if one or more recovery conditions are not met, and a soft validation may allow for a warning to be raised in recovery progress if one or more conditions are not met. Such validations may ensure that no other bulk recoveries are ongoing for a given domain, and that a sufficient amount of applications are present. Some other environment preparation processes may include tuning the recovery environment by configuring the environment to support n recovery jobs to run in parallel for each type of data object, tuning the number of task chains per the number of data objects, tuning the number of semaphores for each data object type, and tuning the number of background backup and indexing jobs.

During the recover step 415, the system may spawn a set of child recoveries corresponding to the selector definition, and a recovery job identifier for the set of child recoveries may be updated in the failover_snappables table 435 (e.g., failover snappables table), including source and recovery IDs and overall recovery status for the child recoveries. The system may monitor the recovery progress of the child recoveries, and once a child recovery completes, its terminal status (e.g., progress) is updated in the relational database, and a sliding window moves forward by picking up the next data object to be recovered in the sorted list. The process iterates through the sliding window for the selected set of data objects until the entire list has been recovered, and there are no data objects left in the selector. Upon completion of a child recovery, the failover_snappables table 435 may be updated with a progress indicator (e.g., completed, failed, etc.) corresponding to the child recovery. After the bulk recovery completes and there are no data objects left corresponding to the selector, the system may update the selector progress by updating aggregated information for the selector in the failover summary table 440. The aggregated information may include snapshot IDs, task chain IDs, recovery status, the number of data snapshots with a successful recovery or a failed recovery, and so on. The system then ends the bulk recovery by clearing the failover_snappables table 435 (e.g., removing entries based on the status of the selector), and rolling back any environment changes implemented during the prepare step 410.

Figure 5:
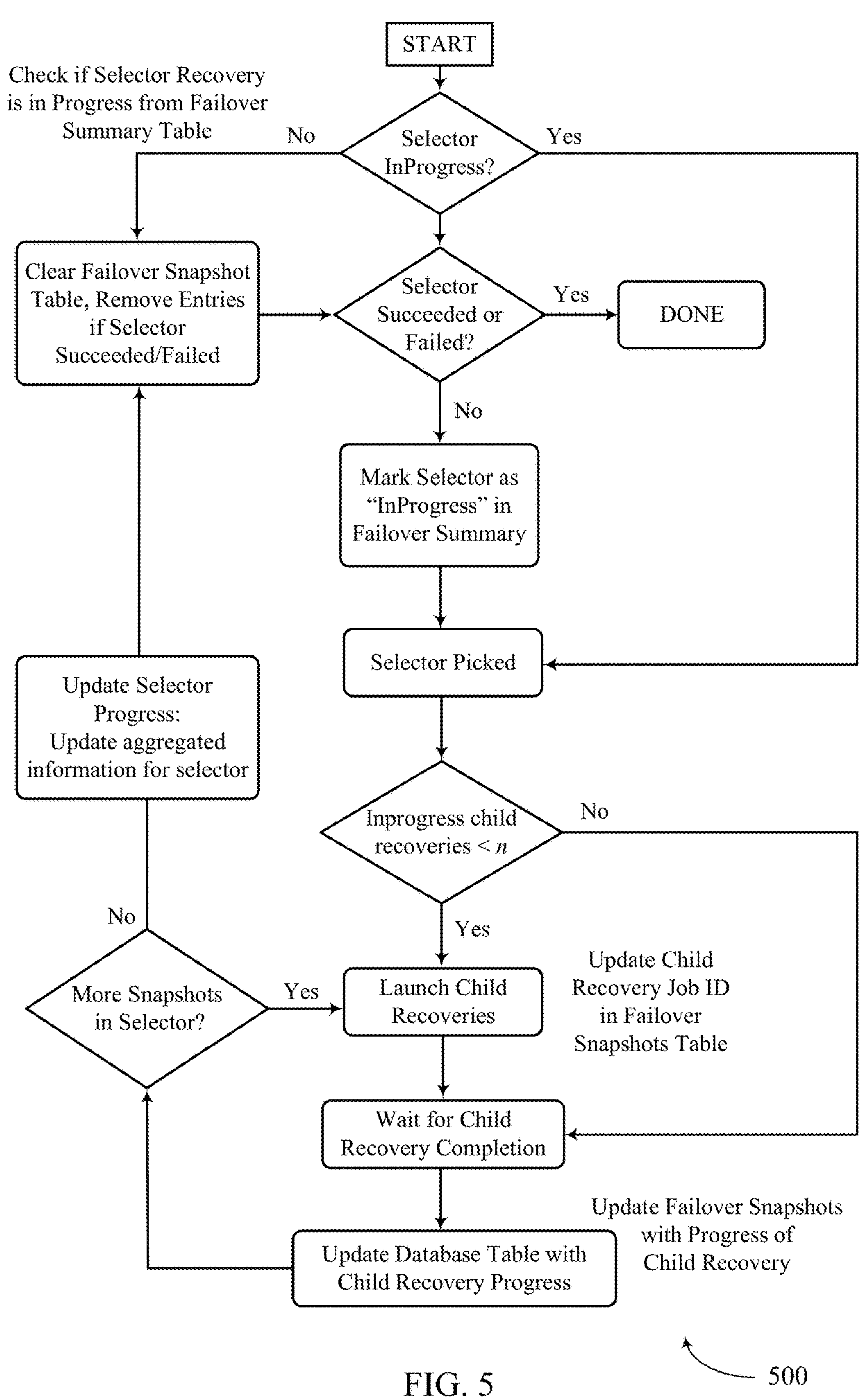
FIG. 5 shows an example of a bulk recovery state diagram that supports bulk recovery framework for computing objects in accordance with aspects of the present disclosure.

FIG. 5 shows an example of a bulk recovery state diagram 500 that supports bulk recovery framework for computing objects in accordance with aspects of the present disclosure. For example, the bulk recovery state diagram 500 may illustrate a mass recovery task chain for selecting and recovering a bulk set of data snapshots as described with reference to FIGS. 2-4, while providing support for bulk recovery cancellation and protection against system crashes.

Mass recoveries for a relatively large quantity (e.g., thousands or more) of data snapshots may run for an extended period of time (e.g., one or more days or weeks) depending on the recovery domain. As such, the mass recovery task chain may be designed to recover from possible crashes that may occur during recovery. For example, a bulk recovery process may include a RECOVER task of the mass recovery task chain which is modeled as the bulk recovery state diagram 500. The bulk recovery state diagram 500 may allow the system to sort through a bulk selected list of data objects to be recovered, and recover the data snapshots by iterating through the list via a sliding window. The sorted list of data objects to be recovered may then be stored in a BLOB storage for easy retrieval. The mass recovery task chain may continuously poll the status of the child recoveries in the current window.

At a first step, the system may check whether the bulk selection is in progress. If bulk selection is in progress (e.g., "yes") the selector is picked and if the in progress child recoveries is less than a threshold n, the child recoveries are launched. Once child recoveries are launched, a recovery job identifier for one or more child recoveries may be updated in the failover data snapshot table. Once a child recovery completes, its terminal status (or progress) is updated in the relational database, and a sliding window moves forward by picking up the next data snapshot in the sorted list. In some examples, there may be n child recoveries in flight at all times (barring the time window when less than "n" data snapshots are left) to be recovered in a selector. The process iterates through the sliding window for the selected set of data snapshots until the entire list has been recovered, and there are no data snapshots left in the selector. Upon completion of a child recovery, the failover data snapshot table may be updated with a progress indicator (e.g., completed, failed, etc.) corresponding to the child recovery. After the bulk recovery completes and there are no data snapshots left corresponding to the selector, the system may update the selector progress by updating aggregated information for the selector and clearing the failover data snapshot table (e.g., removing entries based on the status of the selector).

In case of a crash (or some other recovery failure or system failure), the RECOVER task follows the bulk recovery state diagram 500. The system begins by reading a "maximum" data snapshot ID (by sort order) for which a child recovery job has already finished or is in progress. Since the data objects are recovered in sorted order, the next data objects to be recovered may be identified from the complete sorted list of data snapshots stored as a file object in a BLOB storage. Based on this logic, the RECOVER task may check that no data snapshot is left un-recovered and that no data snapshot is recovered more than once, even if the mass recovery task chain crashes multiple times.

In some examples, the mass recovery task chain persists information on any inflight child recovery jobs in the relational database. This may allow for an end-user to cancel an ongoing mass recovery with potentially hundreds or thousands of inflight recovery jobs. On receiving a "cancel" signal, the mass recovery task chain may cancel the inflight child recovery jobs, if any, and then cancels the ongoing task (e.g., materialize, prepare, recover, cleanup). In such examples, a recovery process for a bulk set of data snapshots may be modified (and potentially canceled) without the need for selecting and modifying individual recovery processes for individual snapshots.

In some examples, the parallelism "n" for child recoveries that will be maintained by the RECOVER task may be based on the data snapshot type. For example, for some types of data snapshots (e.g., M365 OneDrive), n may be 4-5 as that's based on graph throttling associated with the snapshot type. The child recovery task chains launched by the RECOVER task may be the same as the restore task chains, and as such, if there are a given quantity of data snapshots (e.g., 5,000 data snapshots) to be recovered across all selectors, the same quantity of data snapshots may be launched by the RECOVER parent task in total.

In some examples, a selector may translate or correspond to thousands of data snapshots and RECOVER tasks may efficiently track the recovery of selectors. Initially, the child recoveries corresponding to a certain selector will be in progress, and the existing failover data snapshot table may be used to track any ongoing child recoveries. An additional column (e.g., child recovery job ID) may also store the job ID of the child recovery restore job. Once the child recoveries of a selector have finished, the progress status will be stored in a status column of the failover summary table as "SUCCEEDED" or "FAILED." Additional or alternative columns may also be added to the failover summary table to store the aggregate metrics such as the number of snapshots that have been recovered, snapshots with failed recovery, and the total number of data snapshots of such selectors. Once the aggregate metrics have been updated, the selector rows in the failover data snapshot table may be deleted.

In case of the RECOVER task crash, to be able to continue bulk recovery, the RECOVER task may consult book-keeping information for inflight child recovery task chains, wait for inflight child recoveries to finish, if any, and continue from that point onwards. Once all child recoveries of a selector have finished, the corresponding child recovery entries in the failover data snapshot table may be removed.

Figure 6:
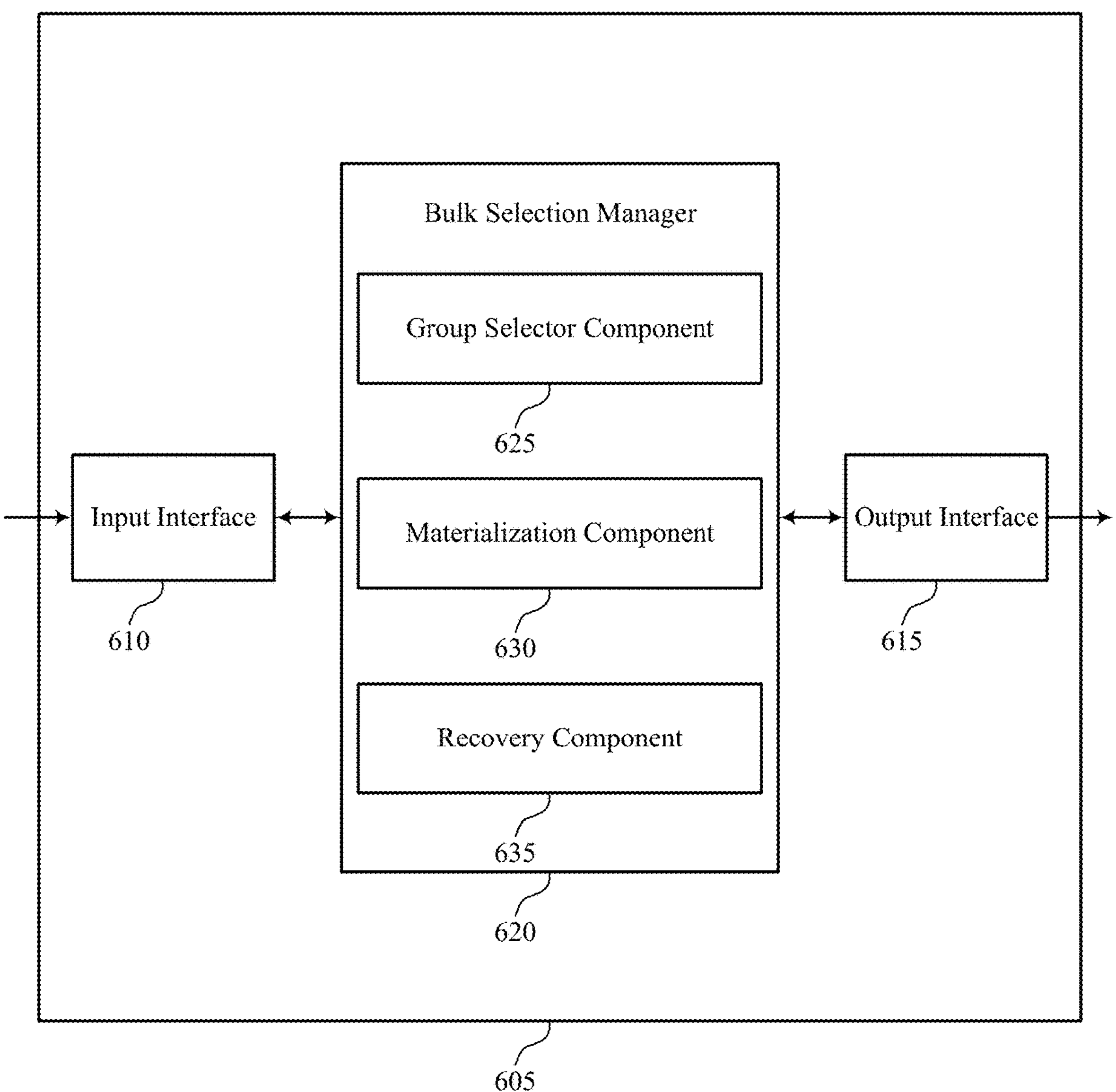
FIG. 6 shows a block diagram of an apparatus that supports bulk recovery framework for computing objects in accordance with aspects of the present disclosure.

FIG. 6 shows a block diagram 600 of a system 605 that supports bulk recovery framework for computing objects in accordance with aspects of the present disclosure. In some examples, the system 605 may be an example of aspects of one or more components described with reference to FIG. 1, such as a DMS 110. The system 605 may include an input interface 610, an output interface 615, and a bulk selection manager 620. The system 605 may also include one or more processors. Each of these components may be in communication with one another (e.g., via one or more buses, communications links, communications interfaces, or any combination thereof).

The input interface 610 may manage input signaling for the system 605. For example, the input interface 610 may receive input signaling (e.g., messages, packets, data, instructions, commands, or any other form of encoded information) from other systems or devices. The input interface 610 may send signaling corresponding to (e.g., representative of or otherwise based on) such input signaling to other components of the system 605 for processing. For example, the input interface 610 may transmit such corresponding signaling to the bulk selection manager 620 to support bulk recovery framework for computing objects. In some cases, the input interface 610 may be a component of a network interface 825 as described with reference to FIG. 8.

The output interface 615 may manage output signaling for the system 605. For example, the output interface 615 may receive signaling from other components of the system 605, such as the bulk selection manager 620, and may transmit such output signaling corresponding to (e.g., representative of or otherwise based on) such signaling to other systems or devices. In some cases, the output interface 615 may be a component of a network interface 825 as described with reference to FIG. 8.

For example, the bulk selection manager 620 may include a group selector component 625, a materialization component 630, a recovery component 635, or any combination thereof. In some examples, the bulk selection manager 620, or various components thereof, may be configured to perform various operations (e.g., receiving, monitoring, transmitting) using or otherwise in cooperation with the input interface 610, the output interface 615, or both. For example, the bulk selection manager 620 may receive information from the input interface 610, send information to the output interface 615, or be integrated in combination with the input interface 610, the output interface 615, or both to receive information, transmit information, or perform various other operations as described herein.

The bulk selection manager 620 may support performing a bulk recovery for a set of backup snapshots in accordance with examples as disclosed herein. The group selector component 625 may be configured as or otherwise support a means for receiving an indication of a backup snapshot group identifier, where the backup snapshot group identifier includes a definition for selecting a set of multiple backup snapshots from the set of backup snapshots for one or more operations associated with a bulk recovery process. The materialization component 630 may be configured as or otherwise support a means for translating the backup snapshot group identifier into a list of object identifiers corresponding to the set of multiple backup snapshots for storage in a binary large object data store. The recovery component 635 may be configured as or otherwise support a means for performing the one or more operations associated with the bulk recovery process on a subset of the set of multiple backup snapshots contained within a sliding window that is iterated through the list of object identifiers within the binary large object data store.

Figure 7:
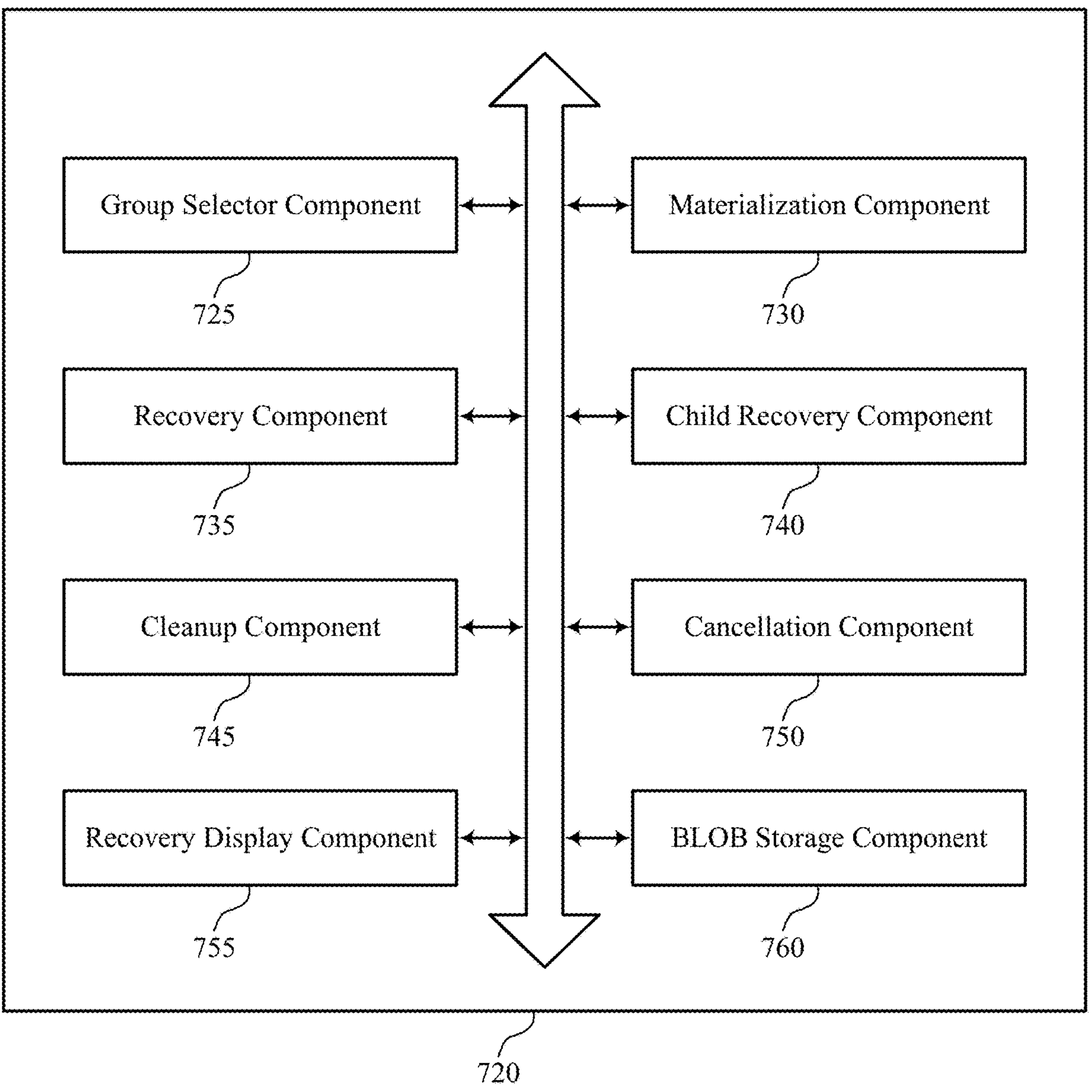
FIG. 7 shows a block diagram of a bulk selection manager that supports bulk recovery framework for computing objects in accordance with aspects of the present disclosure.

FIG. 7 shows a block diagram 700 of a bulk selection manager 720 that supports bulk recovery framework for computing objects in accordance with aspects of the present disclosure. The bulk selection manager 720 may be an example of aspects of a bulk selection manager or a bulk selection manager 620, or both, as described herein. The bulk selection manager 720, or various components thereof, may be an example of means for performing various aspects of bulk recovery framework for computing objects as described herein. For example, the bulk selection manager 720 may include a group selector component 725, a materialization component 730, a recovery component 735, a child recovery component 740, a cleanup component 745, a cancellation component 750, a recovery display component 755, a BLOB storage component 760, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The bulk selection manager 720 may support performing a bulk recovery for a set of backup snapshots in accordance with examples as disclosed herein. The group selector component 725 may be configured as or otherwise support a means for receiving an indication of a backup snapshot group identifier, where the backup snapshot group identifier includes a definition for selecting a set of multiple backup snapshots from the set of backup snapshots for one or more operations associated with a bulk recovery process. The materialization component 730 may be configured as or otherwise support a means for translating the backup snapshot group identifier into a list of object identifiers corresponding to the set of multiple backup snapshots for storage in a binary large object data store. The recovery component 735 may be configured as or otherwise support a means for performing the one or more operations associated with the bulk recovery process on a subset of the set of multiple backup snapshots contained within a sliding window that is iterated through the list of object identifiers within the binary large object data store.

In some examples, the recovery component 735 may be configured as or otherwise support a means for preparing a recovery environment for the bulk recovery process by performing one or more recovery environment validation procedures, tuning one or more application service providers for recovery job configuration, allocating one or more resources for the bulk recovery process, or any combination thereof.

In some examples, to support performing the one or more operations associated with the bulk recovery process, the child recovery component 740 may be configured as or otherwise support a means for parsing the set of multiple backup snapshots corresponding to the list of object identifiers. In some examples, to support performing the one or more operations associated with the bulk recovery process, the child recovery component 740 may be configured as or otherwise support a means for initiating a set of child recovery processes associated with the bulk recovery process, where the set of child recovery processes are included within the sliding window during recovery of a child recovery process and iterated through upon completion of the child recovery process.

In some examples, the child recovery component 740 may be configured as or otherwise support a means for reading a first identifier associated with the child recovery process, where the child recovery process corresponds to a first child recovery process in a sorted list of the set of child recovery processes. In some examples, the child recovery component 740 may be configured as or otherwise support a means for iterating through the set of child recovery processes based on sequential identifiers associated with sequential child recovery processes in the set of child recovery processes.

In some examples, the recovery component 735 may be configured as or otherwise support a means for tracking one or more metrics of the bulk recovery process based on updating respective statuses of a set of child recovery processes associated with the bulk recovery process stored in a relational database.

In some examples, the one or more metrics of the bulk recovery process include a quantity of executed recoveries of the set of multiple backup snapshots, a quantity of failed recoveries of the set of multiple backup snapshots, a quantity of pending recoveries of the set of multiple backup snapshots, a quantity of canceled recoveries of the set of multiple backup snapshots, or any combination thereof.

In some examples, the recovery display component 755 may be configured as or otherwise support a means for displaying, in accordance with a periodicity, a set of aggregated recovery metrics associated with the bulk recovery process via a user interface.

In some examples, the BLOB storage component 760 may be configured as or otherwise support a means for saving, upon completion of the bulk recovery process, a set of aggregated recovery metrics associated with the set of child recovery processes in a separate binary large object data store.

In some examples, the child recovery component 740 may be configured as or otherwise support a means for determining that a child recovery process of the set of child recovery processes has failed. In some examples, the recovery display component 755 may be configured as or otherwise support a means for displaying, via a user interface, an indication of a failure event for the child recovery process and one or more sources of the failure event.

In some examples, the list of object identifiers corresponding to the set of multiple backup snapshots is stored as a file object in the binary large object data store.

In some examples, the cleanup component 745 may be configured as or otherwise support a means for performing a single deletion of the list of object identifiers corresponding to the set of multiple backup snapshots from storage in the binary large object data store upon completion of the bulk recovery process.

In some examples, a relative size of the sliding window is configured based on one or more types of backup snapshots of the set of multiple backup snapshots.

In some examples, the cancellation component 750 may be configured as or otherwise support a means for receiving a cancellation command to cancel the one or more operations associated with the bulk recovery process. In some examples, the cancellation component 750 may be configured as or otherwise support a means for cancelling the one or more operations associated with the bulk recovery process corresponding to the selection of the set of multiple backup snapshots.

In some examples, the cleanup component 745 may be configured as or otherwise support a means for reverting one or more configuration changes of a recovery environment associated with the bulk recovery process, one or more persisted states of the recovery environment, or a combination thereof, upon completion of the bulk recovery process.

In some examples, the definition for selecting the set of multiple backup snapshots is based on one or more active directory groupings, one or more shared file groups, one or more comma separated value (CSV) files, one or more infected snapshots, or any combination thereof.

In some examples, the definition for selecting the set of multiple backup snapshots includes a set of definitions stored in a binary large object.

In some examples, the bulk recovery process is automated via a bulk recovery task chain.

In some examples, the bulk recovery process is performed in a software-as-a-service (SaaS) recovery domain.

Figure 8:
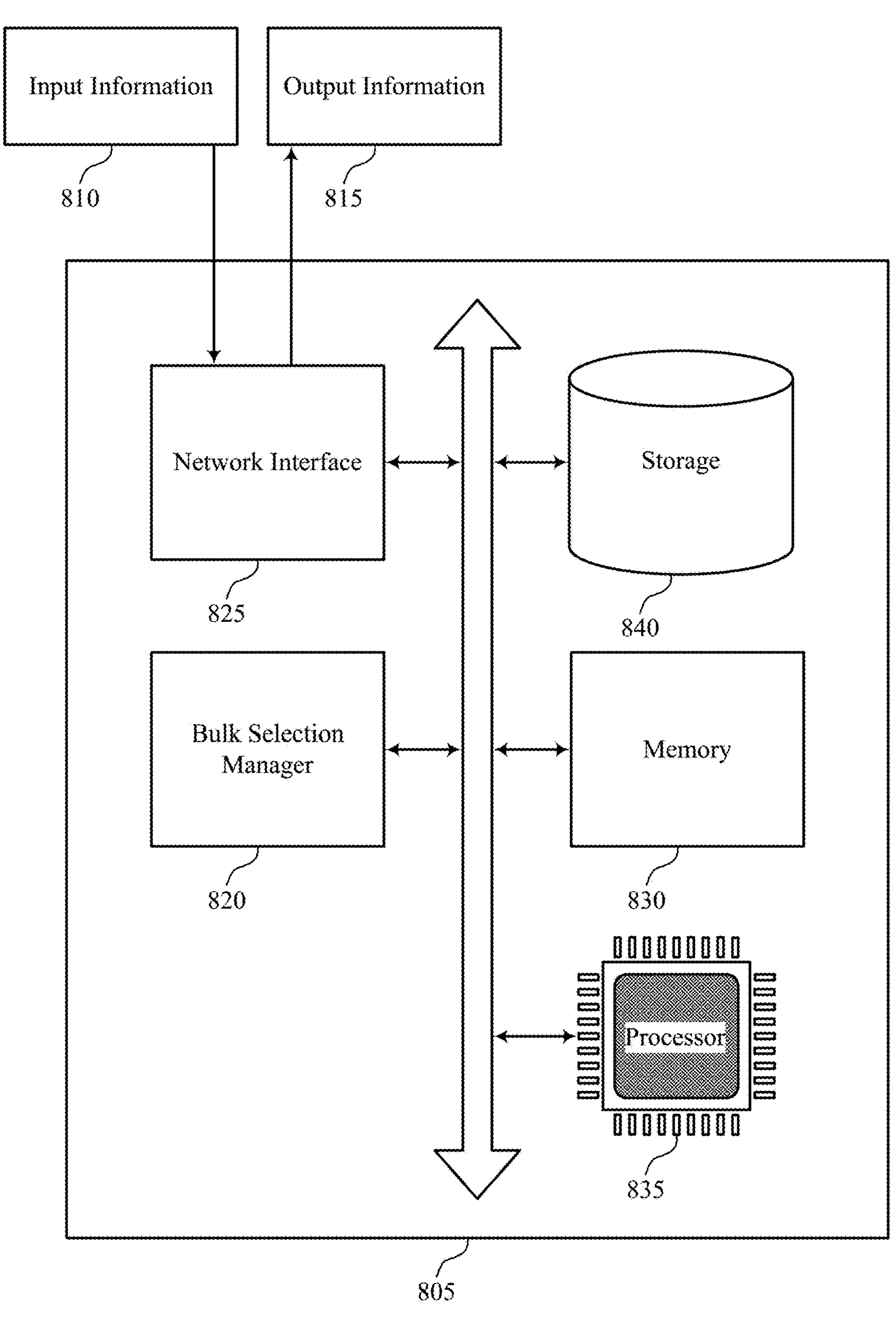
FIG. 8 shows a diagram of a system including a device that supports bulk recovery framework for computing objects in accordance with aspects of the present disclosure.

FIG. 8 shows a block diagram 800 of a system 805 that supports bulk recovery framework for computing objects in accordance with aspects of the present disclosure. The system 805 may be an example of or include the components of a system 605 as described herein. The system 805 may include components for data management, including components such as a bulk selection manager 820, an input information 810, an output information 815, a network interface 825, at least one memory 830, at least one processor 835, and a storage 840. These components may be in electronic communication or otherwise coupled with each other (e.g., operatively, communicatively, functionally, electronically, electrically; via one or more buses, communications links, communications interfaces, or any combination thereof). Additionally, the components of the system 805 may include corresponding physical components or may be implemented as corresponding virtual components (e.g., components of one or more virtual machines). In some examples, the system 805 may be an example of aspects of one or more components described with reference to FIG. 1, such as a DMS 110.

The network interface 825 may enable the system 805 to exchange information (e.g., input information 810, output information 815, or both) with other systems or devices (not shown). For example, the network interface 825 may enable the system 805 to connect to a network (e.g., a network 120 as described herein). The network interface 825 may include one or more wireless network interfaces, one or more wired network interfaces, or any combination thereof. In some examples, the network interface 825 may be an example of may be an example of aspects of one or more components described with reference to FIG. 1, such as one or more network interfaces 165.

Memory 830 may include RAM, ROM, or both. The memory 830 may store computer-readable, computer-executable software including instructions that, when executed, cause the processor 835 to perform various functions described herein. In some cases, the memory 830 may contain, among other things, a basic input/output system (BIOS), which may control basic hardware or software operation such as the interaction with peripheral components or devices. In some cases, the memory 830 may be an example of aspects of one or more components described with reference to FIG. 1, such as one or more memories 175.

The processor 835 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 835 may be configured to execute computer-readable instructions stored in a memory 830 to perform various functions (e.g., functions or tasks supporting bulk recovery framework for computing objects). Though a single processor 835 is depicted in the example of FIG. 8, it is to be understood that the system 805 may include any quantity of one or more of processors 835 and that a group of processors 835 may collectively perform one or more functions ascribed herein to a processor, such as the processor 835. In some cases, the processor 835 may be an example of aspects of one or more components described with reference to FIG. 1, such as one or more processors 170.

Storage 840 may be configured to store data that is generated, processed, stored, or otherwise used by the system 805. In some cases, the storage 840 may include one or more HDDs, one or more SDDs, or both. In some examples, the storage 840 may be an example of a single database, a distributed database, multiple distributed databases, a data store, a data lake, or an emergency backup database. In some examples, the storage 840 may be an example of one or more components described with reference to FIG. 1, such as one or more network disks 180.

The bulk selection manager 820 may support performing a bulk recovery for a set of backup snapshots in accordance with examples as disclosed herein. For example, the bulk selection manager 820 may be configured as or otherwise support a means for receiving an indication of a backup snapshot group identifier, where the backup snapshot group identifier includes a definition for selecting a set of multiple backup snapshots from the set of backup snapshots for one or more operations associated with a bulk recovery process. The bulk selection manager 820 may be configured as or otherwise support a means for translating the backup snapshot group identifier into a list of object identifiers corresponding to the set of multiple backup snapshots for storage in a binary large object data store. The bulk selection manager 820 may be configured as or otherwise support a means for performing the one or more operations associated with the bulk recovery process on a subset of the set of multiple backup snapshots contained within a sliding window that is iterated through the list of object identifiers within the binary large object data store.

By including or configuring the bulk selection manager 820 in accordance with examples as described herein, the system 805 may support techniques for bulk recovery framework for computing objects, which may provide one or more benefits such as, for example, improved user experience, reduced latency associated with selection and recovery of a bulk set of computing snapshots, more efficient utilization of computing resources, network resources or both, improved scalability, improved security, improved selection efficiency, and enhanced management of a relatively large set of computing snapshots, among other possibilities.

Figure 9:
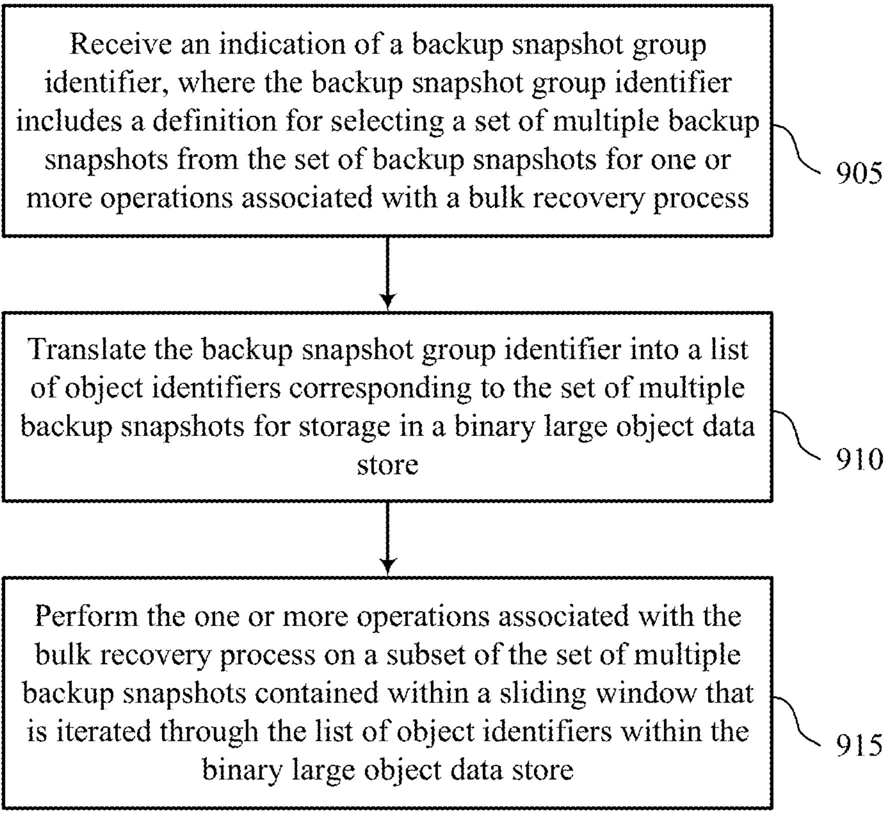
FIGS. 9 through 12 show flowcharts illustrating methods that support bulk recovery framework for computing objects in accordance with aspects of the present disclosure.

FIG. 9 shows a flowchart illustrating a method 900 that supports bulk recovery framework for computing objects in accordance with aspects of the present disclosure. The operations of the method 900 may be implemented by a DMS or its components as described herein. For example, the operations of the method 900 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 905, the method may include receiving an indication of a backup snapshot group identifier, where the backup snapshot group identifier includes a definition for selecting a set of multiple backup snapshots from the set of backup snapshots for one or more operations associated with a bulk recovery process. The operations of block 905 may be performed in accordance with examples as disclosed herein. In some examples, aspects of the operations of 905 may be performed by a group selector component 725 as described with reference to FIG. 7.

At 910, the method may include translating the backup snapshot group identifier into a list of object identifiers corresponding to the set of multiple backup snapshots for storage in a binary large object data store. The operations of block 910 may be performed in accordance with examples as disclosed herein. In some examples, aspects of the operations of 910 may be performed by a materialization component 730 as described with reference to FIG. 7.

At 915, the method may include performing the one or more operations associated with the bulk recovery process on a subset of the set of multiple backup snapshots contained within a sliding window that is iterated through the list of object identifiers within the binary large object data store. The operations of block 915 may be performed in accordance with examples as disclosed herein. In some examples, aspects of the operations of 915 may be performed by a recovery component 735 as described with reference to FIG. 7.

Figure 10:
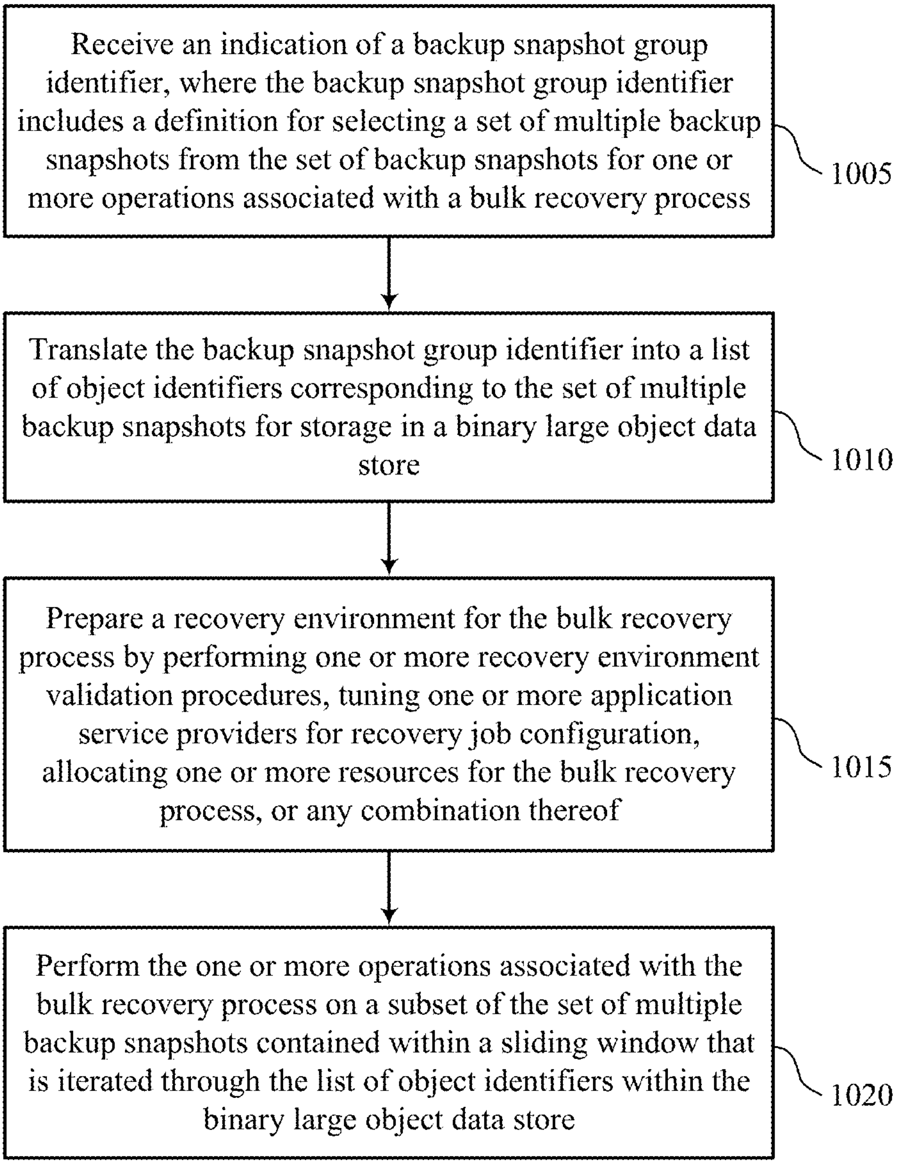

FIG. 10 shows a flowchart illustrating a method 1000 that supports bulk recovery framework for computing objects in accordance with aspects of the present disclosure. The operations of the method 1000 may be implemented by a DMS or its components as described herein. For example, the operations of the method 1000 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 1005, the method may include receiving an indication of a backup snapshot group identifier, where the backup snapshot group identifier includes a definition for selecting a set of multiple backup snapshots from the set of backup snapshots for one or more operations associated with a bulk recovery process. The operations of block 1005 may be performed in accordance with examples as disclosed herein. In some examples, aspects of the operations of 1005 may be performed by a group selector component 725 as described with reference to FIG. 7.

At 1010, the method may include translating the backup snapshot group identifier into a list of object identifiers corresponding to the set of multiple backup snapshots for storage in a binary large object data store. The operations of block 1010 may be performed in accordance with examples as disclosed herein. In some examples, aspects of the operations of 1010 may be performed by a materialization component 730 as described with reference to FIG. 7.

At 1015, the method may include preparing a recovery environment for the bulk recovery process by performing one or more recovery environment validation procedures, tuning one or more application service providers for recovery job configuration, allocating one or more resources for the bulk recovery process, or any combination thereof. The operations of block 1015 may be performed in accordance with examples as disclosed herein. In some examples, aspects of the operations of 1015 may be performed by a recovery component 735 as described with reference to FIG. 7.

At 1020, the method may include performing the one or more operations associated with the bulk recovery process on a subset of the set of multiple backup snapshots contained within a sliding window that is iterated through the list of object identifiers within the binary large object data store. The operations of block 1020 may be performed in accordance with examples as disclosed herein. In some examples, aspects of the operations of 1020 may be performed by a recovery component 735 as described with reference to FIG. 7.

Figure 11:
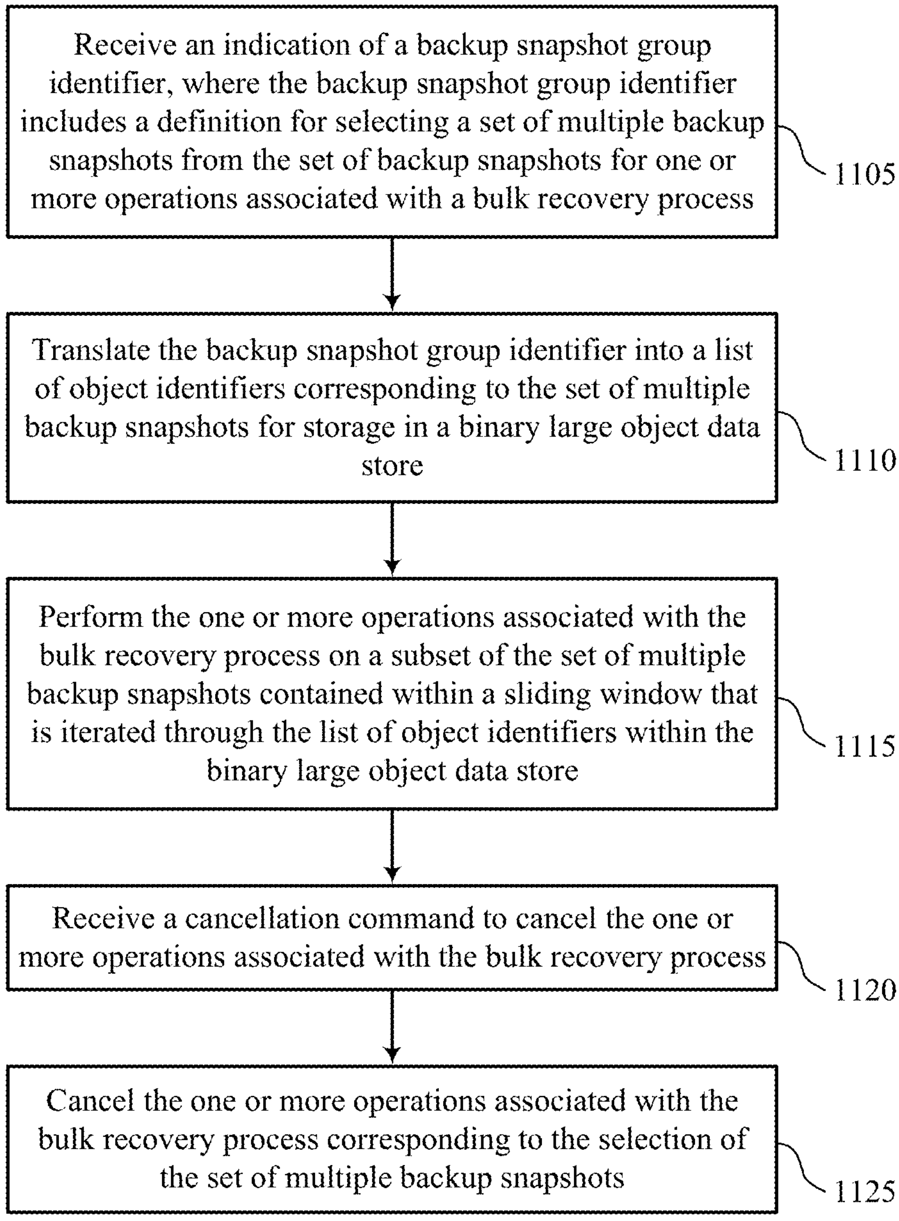

FIG. 11 shows a flowchart illustrating a method 1100 that supports bulk recovery framework for computing objects in accordance with aspects of the present disclosure. The operations of the method 1100 may be implemented by a DMS or its components as described herein. For example, the operations of the method 1100 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 1105, the method may include receiving an indication of a backup snapshot group identifier, where the backup snapshot group identifier includes a definition for selecting a set of multiple backup snapshots from the set of backup snapshots for one or more operations associated with a bulk recovery process. The operations of block 1105 may be performed in accordance with examples as disclosed herein. In some examples, aspects of the operations of 1105 may be performed by a group selector component 725 as described with reference to FIG. 7.

At 1110, the method may include translating the backup snapshot group identifier into a list of object identifiers corresponding to the set of multiple backup snapshots for storage in a binary large object data store. The operations of block 1110 may be performed in accordance with examples as disclosed herein. In some examples, aspects of the operations of 1110 may be performed by a materialization component 730 as described with reference to FIG. 7.

At 1115, the method may include performing the one or more operations associated with the bulk recovery process on a subset of the set of multiple backup snapshots contained within a sliding window that is iterated through the list of object identifiers within the binary large object data store. The operations of block 1115 may be performed in accordance with examples as disclosed herein. In some examples, aspects of the operations of 1115 may be performed by a recovery component 735 as described with reference to FIG. 7.

At 1120, the method may include receiving a cancellation command to cancel the one or more operations associated with the bulk recovery process. The operations of block 1120 may be performed in accordance with examples as disclosed herein. In some examples, aspects of the operations of 1120 may be performed by a cancellation component 750 as described with reference to FIG. 7.

At 1125, the method may include cancelling the one or more operations associated with the bulk recovery process corresponding to the selection of the set of multiple backup snapshots. The operations of block 1125 may be performed in accordance with examples as disclosed herein. In some examples, aspects of the operations of 1125 may be performed by a cancellation component 750 as described with reference to FIG. 7.

Figure 12:
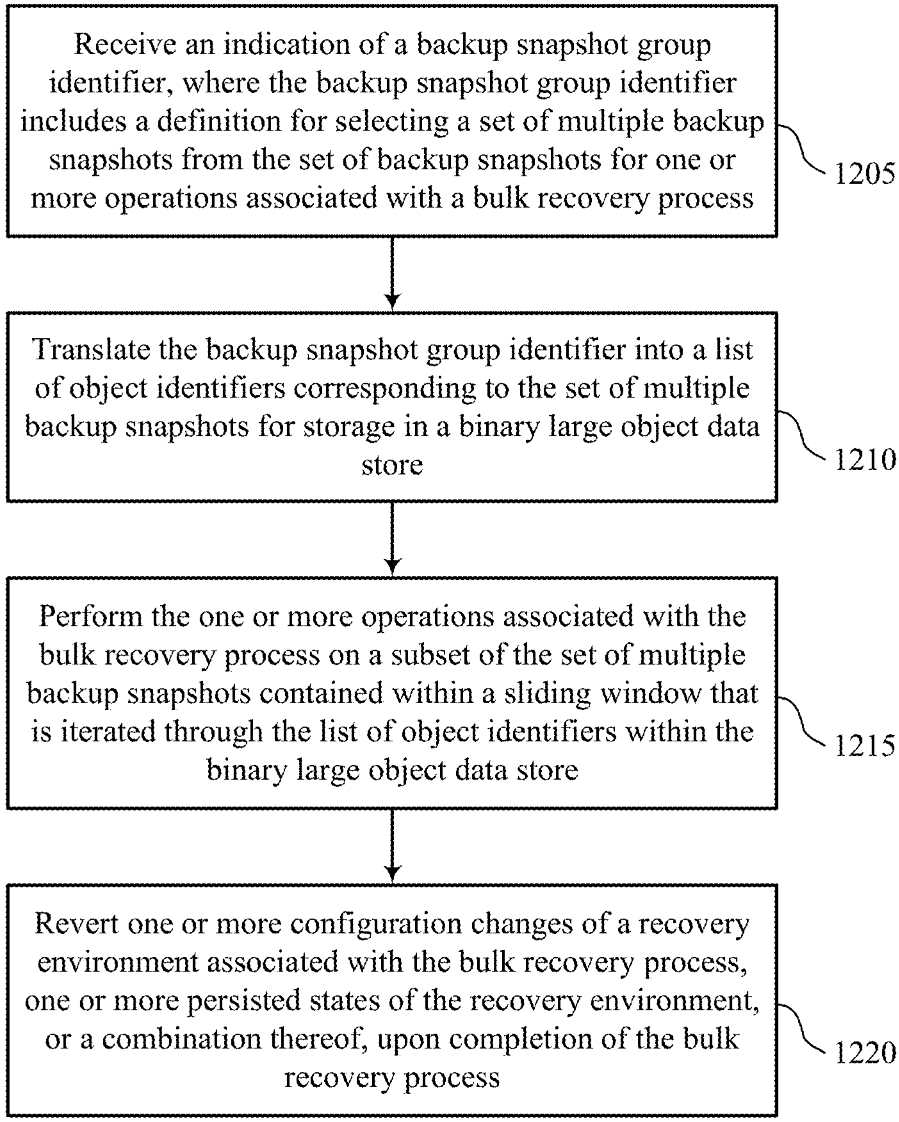

FIG. 12 shows a flowchart illustrating a method 1200 that supports bulk recovery framework for computing objects in accordance with aspects of the present disclosure. The operations of the method 1200 may be implemented by a DMS or its components as described herein. For example, the operations of the method 1200 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 1205, the method may include receiving an indication of a backup snapshot group identifier, where the backup snapshot group identifier includes a definition for selecting a set of multiple backup snapshots from the set of backup snapshots for one or more operations associated with a bulk recovery process. The operations of block 1205 may be performed in accordance with examples as disclosed herein. In some examples, aspects of the operations of 1205 may be performed by a group selector component 725 as described with reference to FIG. 7.

At 1210, the method may include translating the backup snapshot group identifier into a list of object identifiers corresponding to the set of multiple backup snapshots for storage in a binary large object data store. The operations of block 1210 may be performed in accordance with examples as disclosed herein. In some examples, aspects of the operations of 1210 may be performed by a materialization component 730 as described with reference to FIG. 7.

At 1215, the method may include performing the one or more operations associated with the bulk recovery process on a subset of the set of multiple backup snapshots contained within a sliding window that is iterated through the list of object identifiers within the binary large object data store. The operations of block 1215 may be performed in accordance with examples as disclosed herein. In some examples, aspects of the operations of 1215 may be performed by a recovery component 735 as described with reference to FIG. 7.

At 1220, the method may include reverting one or more configuration changes of a recovery environment associated with the bulk recovery process, one or more persisted states of the recovery environment, or a combination thereof, upon completion of the bulk recovery process. The operations of block 1220 may be performed in accordance with examples as disclosed herein. In some examples, aspects of the operations of 1220 may be performed by a cleanup component 745 as described with reference to FIG. 7.

A method for performing a bulk recovery for a set of backup snapshots by an apparatus is described. The method may include receiving an indication of a backup snapshot group identifier, where the backup snapshot group identifier includes a definition for selecting a set of multiple backup snapshots from the set of backup snapshots for one or more operations associated with a bulk recovery process, translating the backup snapshot group identifier into a list of object identifiers corresponding to the set of multiple backup snapshots for storage in a binary large object data store, and performing the one or more operations associated with the bulk recovery process on a subset of the set of multiple backup snapshots contained within a sliding window that is iterated through the list of object identifiers within the binary large object data store.

An apparatus for performing a bulk recovery for a set of backup snapshots is described. The apparatus may include one or more memories storing processor executable code, and one or more processors coupled with the one or more memories. The one or more processors may individually or collectively operable to execute the code to cause the apparatus to receive an indication of a backup snapshot group identifier, where the backup snapshot group identifier includes a definition for selecting a set of multiple backup snapshots from the set of backup snapshots for one or more operations associated with a bulk recovery process, translate the backup snapshot group identifier into a list of object identifiers corresponding to the set of multiple backup snapshots for storage in a binary large object data store, and perform the one or more operations associated with the bulk recovery process on a subset of the set of multiple backup snapshots contained within a sliding window that is iterated through the list of object identifiers within the binary large object data store.

Another apparatus for performing a bulk recovery for a set of backup snapshots is described. The apparatus may include means for receiving an indication of a backup snapshot group identifier, where the backup snapshot group identifier includes a definition for selecting a set of multiple backup snapshots from the set of backup snapshots for one or more operations associated with a bulk recovery process, means for translating the backup snapshot group identifier into a list of object identifiers corresponding to the set of multiple backup snapshots for storage in a binary large object data store, and means for performing the one or more operations associated with the bulk recovery process on a subset of the set of multiple backup snapshots contained within a sliding window that is iterated through the list of object identifiers within the binary large object data store.

A non-transitory computer-readable medium storing code for performing a bulk recovery for a set of backup snapshots is described. The code may include instructions executable by a processor to receive an indication of a backup snapshot group identifier, where the backup snapshot group identifier includes a definition for selecting a set of multiple backup snapshots from the set of backup snapshots for one or more operations associated with a bulk recovery process, translate the backup snapshot group identifier into a list of object identifiers corresponding to the set of multiple backup snapshots for storage in a binary large object data store, and perform the one or more operations associated with the bulk recovery process on a subset of the set of multiple backup snapshots contained within a sliding window that is iterated through the list of object identifiers within the binary large object data store.

Some examples of the method, apparatus, and non-transitory computer-readable medium described herein may further include operations, features, means, or instructions for preparing a recovery environment for the bulk recovery process by performing one or more recovery environment validation procedures, tuning one or more application service providers for recovery job configuration, allocating one or more resources for the bulk recovery process, or any combination thereof.

In some examples of the method, apparatus, and non-transitory computer-readable medium described herein, performing the one or more operations associated with the bulk recovery process may include operations, features, means, or instructions for parsing the set of multiple backup snapshots corresponding to the list of object identifiers and initiating a set of child recovery processes associated with the bulk recovery process, where the set of child recovery processes may be included within the sliding window during recovery of a child recovery process and iterated through upon completion of the child recovery process.

Some examples of the method, apparatus, and non-transitory computer-readable medium described herein may further include operations, features, means, or instructions for reading a first identifier associated with the child recovery process, where the child recovery process corresponds to a first child recovery process in a sorted list of the set of child recovery processes and iterating through the set of child recovery processes based on sequential identifiers associated with sequential child recovery processes in the set of child recovery processes.

Some examples of the method, apparatus, and non-transitory computer-readable medium described herein may further include operations, features, means, or instructions for tracking one or more metrics of the bulk recovery process based on updating respective statuses of a set of child recovery processes associated with the bulk recovery process stored in a relational database.

In some examples of the method, apparatus, and non-transitory computer-readable medium described herein, the one or more metrics of the bulk recovery process include a quantity of executed recoveries of the set of multiple backup snapshots, a quantity of failed recoveries of the set of multiple backup snapshots, a quantity of pending recoveries of the set of multiple backup snapshots, a quantity of canceled recoveries of the set of multiple backup snapshots, or any combination thereof.

Some examples of the method, apparatus, and non-transitory computer-readable medium described herein may further include operations, features, means, or instructions for displaying, in accordance with a periodicity, a set of aggregated recovery metrics associated with the bulk recovery process via a user interface.

Some examples of the method, apparatus, and non-transitory computer-readable medium described herein may further include operations, features, means, or instructions for saving, upon completion of the bulk recovery process, a set of aggregated recovery metrics associated with the set of child recovery processes in a separate binary large object data store.

Some examples of the method, apparatus, and non-transitory computer-readable medium described herein may further include operations, features, means, or instructions for determining that a child recovery process of the set of child recovery processes may have failed and displaying, via a user interface, an indication of a failure event for the child recovery process and one or more sources of the failure event.

In some examples of the method, apparatus, and non-transitory computer-readable medium described herein, the list of object identifiers corresponding to the set of multiple backup snapshots may be stored as a file object in the binary large object data store.

Some examples of the method, apparatus, and non-transitory computer-readable medium described herein may further include operations, features, means, or instructions for performing a single deletion of the list of object identifiers corresponding to the set of multiple backup snapshots from storage in the binary large object data store upon completion of the bulk recovery process.

In some examples of the method, apparatus, and non-transitory computer-readable medium described herein, a relative size of the sliding window may be configured based on one or more types of backup snapshots of the set of multiple backup snapshots.

Some examples of the method, apparatus, and non-transitory computer-readable medium described herein may further include operations, features, means, or instructions for receiving a cancellation command to cancel the one or more operations associated with the bulk recovery process and cancelling the one or more operations associated with the bulk recovery process corresponding to the selection of the set of multiple backup snapshots.

Some examples of the method, apparatus, and non-transitory computer-readable medium described herein may further include operations, features, means, or instructions for reverting one or more configuration changes of a recovery environment associated with the bulk recovery process, one or more persisted states of the recovery environment, or a combination thereof, upon completion of the bulk recovery process.

In some examples of the method, apparatus, and non-transitory computer-readable medium described herein, the definition for selecting the set of multiple backup snapshots may be based on one or more active directory groupings, one or more shared file groups, one or more comma separated value (CSV) files, one or more infected snapshots, or any combination thereof.

In some examples of the method, apparatus, and non-transitory computer-readable medium described herein, the definition for selecting the set of multiple backup snapshots includes a set of definitions stored in a binary large object.

In some examples of the method, apparatus, and non-transitory computer-readable medium described herein, the bulk recovery process may be automated via a bulk recovery task chain.

In some examples of the method, apparatus, and non-transitory computer-readable medium described herein, the bulk recovery process may be performed in a software-as-a-service (SaaS) recovery domain.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns.

Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:

receiving an indication of a backup snapshot group identifier, wherein the backup snapshot group identifier comprises a definition for selecting a plurality of backup snapshots from a set of backup snapshots for one or more recovery operations associated with a bulk recovery process for a type of data object;

translating the backup snapshot group identifier into a list of object identifiers corresponding to the plurality of backup snapshots, the list of object identifiers being stored in a file object in a binary large object data store;

preparing, based at least in part on the type of data object, a recovery environment for the bulk recovery process by allocating resources for the bulk recovery process to be used in the recovery environment; and performing the one or more recovery operations associated with the bulk recovery process on a subset of the plurality of backup snapshots contained within a sliding window of recovery jobs, wherein the sliding window iterates through the list of object identifiers within the binary large object data store to iteratively recover the subset of the plurality of backup snapshots, wherein a relative size of the sliding window is configured based at least in part on one or more types of backup snapshots of the plurality of backup snapshots, and wherein the one or more recovery operations occur in parallel for each of the subset of the plurality of backup snapshots contained within the sliding window of recovery jobs.

2. The method of claim 1, wherein preparing the recovery environment for the bulk recovery process further comprises:

performing one or more recovery environment validation procedures, tuning one or more application service providers for recovery job configuration, or both.

3. The method of claim 1, wherein performing the one or more recovery operations associated with the bulk recovery process comprises:

parsing the plurality of backup snapshots corresponding to the list of object identifiers; and initiating a set of child recovery processes associated with the bulk recovery process, wherein the set of child recovery processes are included within the sliding window during recovery of a child recovery process and iterated through after completion of the child recovery process.

4. The method of claim 3, further comprising:

reading a first identifier associated with the child recovery process, wherein the child recovery process corresponds to a first child recovery process in a sorted list of the set of child recovery processes; and iterating through the set of child recovery processes based at least in part on sequential identifiers associated with sequential child recovery processes in the set of child recovery processes.

5. The method of claim 1, further comprising:

tracking one or more metrics of the bulk recovery process based at least in part on updating respective statuses of a set of child recovery processes associated with the bulk recovery process stored in a relational database.

6. The method of claim 5, wherein the one or more metrics of the bulk recovery process comprise a quantity of executed recoveries of the plurality of backup snapshots, a quantity of failed recoveries of the plurality of backup snapshots, a quantity of pending recoveries of the plurality of backup snapshots, a quantity of canceled recoveries of the plurality of backup snapshots, or any combination thereof.

7. The method of claim 5, further comprising:

displaying, in accordance with a periodicity, a set of aggregated recovery metrics associated with the bulk recovery process via a user interface.

8. The method of claim 5, further comprising:

saving, after completion of the bulk recovery process, a set of aggregated recovery metrics associated with the set of child recovery processes in a separate binary large object data store.

9. The method of claim 5, further comprising:

determining that a child recovery process of the set of child recovery processes has failed; and displaying, via a user interface, an indication of a failure event for the child recovery process and one or more sources of the failure event.

10. The method of claim 1, further comprising:

performing a single deletion of the list of object identifiers corresponding to the plurality of backup snapshots from storage in the binary large object data store after completion of the bulk recovery process.

11. The method of claim 1, further comprising:

receiving a cancellation command to cancel the one or more recovery operations associated with the bulk recovery process; and cancelling the one or more recovery operations associated with the bulk recovery process corresponding to selection of the plurality of backup snapshots.

12. The method of claim 1, further comprising:

reverting one or more configuration changes of the recovery environment associated with the bulk recovery process, one or more persisted states of the recovery environment, or a combination thereof, after completion of the bulk recovery process.

13. The method of claim 1, wherein the definition for selecting the plurality of backup snapshots is based at least in part on one or more active directory groupings, one or more shared file groups, one or more comma separated value (CSV) files, one or more infected snapshots, or any combination thereof.

14. The method of claim 1, wherein the definition for selecting the plurality of backup snapshots comprises a set of definitions stored in the binary large object data store.

15. The method of claim 1, wherein the bulk recovery process is automated via a bulk recovery task chain.

16. The method of claim 1, wherein the bulk recovery process is performed in a software-as-a-service (SaaS) recovery domain.

17. An apparatus, comprising:

one or more memories storing processor-executable code; and one or more processors coupled with the one or more memories and individually or collectively operable to execute the code to cause the apparatus to:

receive an indication of a backup snapshot group identifier, wherein the backup snapshot group identifier comprises a definition for selecting a plurality of backup snapshots from a set of backup snapshots for one or more recovery operations associated with a bulk recovery process for a type of data object;

translate the backup snapshot group identifier into a list of object identifiers corresponding to the plurality of backup snapshots, the list of object identifiers being stored in a file object in a binary large object data store;

prepare, based at least in part on the type of data object, a recovery environment for the bulk recovery process by allocating resources for the bulk recovery process to be used in the recovery environment; and perform the one or more recovery operations associated with the bulk recovery process on a subset of the plurality of backup snapshots contained within a sliding window of recovery jobs, wherein the sliding window iterates through the list of object identifiers within the binary large object data store to iteratively recover the subset of the plurality of backup snapshots, wherein a relative size of the sliding window is configured based at least in part on one or more types of backup snapshots of the plurality of backup snapshots, and wherein the one or more recovery operations occur in parallel for each of the subset of the plurality of backup snapshots contained within the sliding window of recovery jobs.

18. A non-transitory computer-readable medium storing code, the code comprising instructions executable by one or more processors to:

receive an indication of a backup snapshot group identifier, wherein the backup snapshot group identifier comprises a definition for selecting a plurality of backup snapshots from a set of backup snapshots for one or more recovery operations associated with a bulk recovery process for a type of data object;

translate the backup snapshot group identifier into a list of object identifiers corresponding to the plurality of backup snapshots, the list of object identifiers being stored in a file object in a binary large object data store;

prepare, based at least in part on the type of data object, a recovery environment for the bulk recovery process by allocating resources for the bulk recovery process to be used in the recovery environment; and perform the one or more recovery operations associated with the bulk recovery process on a subset of the plurality of backup snapshots contained within a sliding window of recovery jobs, wherein the sliding window iterates through the list of object identifiers within the binary large object data store to iteratively recover the subset of the plurality of backup snapshots, wherein a relative size of the sliding window is configured based at least in part on one or more types of backup snapshots of the plurality of backup snapshots, and wherein the one or more recovery operations occur in parallel for each of the subset of the plurality of backup snapshots contained within the sliding window of recovery jobs.

* * * * *